(12) United States Patent
Alexander

(10) Patent No.: US 10,571,617 B2
(45) Date of Patent: Feb. 25, 2020

(54) SYSTEMS, DEVICES, AND METHODS FOR CURVED WAVEGUIDES INTEGRATED WITH CURVED EYEGLASS LENSES

(71) Applicant: North Inc., Kitchener (CA)

(72) Inventor: Stefan Alexander, Elmira (CA)

(73) Assignee: North Inc., Kitchener, ON (CA)

( * ) Notice: Subject to any disclaimer, the term of this patent is extended or adjusted under 35 U.S.C. 154(b) by 0 days.

(21) Appl. No.: 15/946,565

(22) Filed: Apr. 5, 2018

(65) Prior Publication Data

US 2018/0292659 A1 Oct. 11, 2018

Related U.S. Application Data

(60) Provisional application No. 62/482,062, filed on Apr. 5, 2017.

(51) Int. Cl.
| | |
|---|---|
| *F21V 8/00* | (2006.01) |
| *G03H 1/22* | (2006.01) |
| *G02B 27/01* | (2006.01) |
| *G02C 7/02* | (2006.01) |
| *G02C 9/00* | (2006.01) |
| *G02C 11/00* | (2006.01) |

(52) U.S. Cl.
CPC ........... *G02B 6/0031* (2013.01); *G02B 6/005* (2013.01); *G02B 6/0016* (2013.01); *G02B 6/0023* (2013.01); *G02B 6/0038* (2013.01); *G02B 27/0172* (2013.01); *G02C 7/02* (2013.01); *G02C 9/00* (2013.01); *G03H 1/2205* (2013.01); *G02B 2027/013* (2013.01); *G02B 2027/0174* (2013.01); *G02B 2027/0178* (2013.01); *G02C 11/10* (2013.01)

(58) Field of Classification Search
CPC ...... G02B 2027/0125; G02B 2027/013; G02B 2027/0174
See application file for complete search history.

(56) References Cited

U.S. PATENT DOCUMENTS

| | | | |
|---|---|---|---|
| 2016/0357016 A1* | 12/2016 | Cakmakci | ................ H04N 5/33 |
| 2017/0010465 A1* | 1/2017 | Martinez | ............ G02B 27/0172 |
| 2017/0371160 A1* | 12/2017 | Schultz | .............. G02B 27/0176 |

\* cited by examiner

*Primary Examiner* — Chun-Nan Lin

(74) *Attorney, Agent, or Firm* — Thomas Mahon

(57) ABSTRACT

Systems, devices, and methods that implement waveguides in curved transparent combiners that are well-suited for use in wearable heads-up displays (WHUDs) are described. Waveguide structures with in-couplers and out-couplers are integrated with curved eyeglass lenses to provide transparent combiners that substantially match the shape, size, and geometry of conventional eyeglass lenses and can, in some implementations, embody prescription curvatures to serve as prescription eyeglass lenses. The waveguides and in-/out-couplers are planar or curved depending on the implementation.
WHUDs that employ such curved transparent combiners are also described.

13 Claims, 6 Drawing Sheets

SYSTEMS, DEVICES, AND METHODS FOR CURVED WAVEGUIDES INTEGRATED WITH CURVED EYEGLASS LENSES

TECHNICAL FIELD

The present systems, devices, and methods generally relate to integrating waveguides with curved eyeglass lenses, and particularly relate to systems, devices, and methods that employ curved eyeglass lenses with waveguides integrated therewith in wearable heads-up displays.

BACKGROUND

Description of the Related Art

Wearable Heads-Up Displays

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. The "combiner" component of a wearable heads-up display is the physical structure where display light and environmental light merge as one within the user's field of view. The combiner of a wearable heads-up display is typically transparent to environmental light but includes some optical routing mechanism to direct display light into the user's field of view.

Examples of wearable heads-up displays include: the Google Glass®, the Optinvent Ora®, the Epson Moverio®, and the Microsoft Hololens® just to name a few.

Optical Waveguides in Wearable Heads-Up Displays

A majority of currently available wearable heads-up displays employ optical waveguide systems in the transparent combiner. An optical waveguide operates under the principle of total internal reflection (TIR). TIR occurs when light remains in a first medium upon incidence at a boundary with a second medium because the refractive index of the first medium is greater than the refractive index of the second medium and the angle of incidence of the light at the boundary is above a specific critical angle that is a function of those refractive indices. Optical waveguides employed in wearable heads-up displays like those mentioned above typically consist of rectangular prisms of material with a higher refractive index then the surrounding medium, usually air (Google Glass®, Optinvent Ora®, Epson Moverio®) or a planar lens (Microsoft Hololens®). Light input into the prism will propagate along the length of the prism as long as the light continues to be incident at boundaries between the prism and the surrounding medium at an angle above the critical angle. Optical waveguides employ in-coupling and out-coupling elements to ensure that light follows a specific path along the waveguide and then exits the waveguide at a specific location in order to create an image that is visible to the user.

The optical performance of a wearable heads-up display is an important factor in its design. When it comes to face-worn devices, however, users also care a lot about aesthetics. This is clearly highlighted by the immensity of the eyeglasses (including sunglasses) frame industry. Independent of their performance limitations, many of the aforementioned examples of wearable heads-up displays have struggled to find traction in consumer markets because, at least in part, they lack fashion appeal. Most wearable heads-up displays presented to date employ planar waveguides in planar transparent combiners and, as a result, appear very bulky and unnatural on a user's face compared to the more sleek and streamlined look of typical curved eyeglass and sunglass lenses. There is a need in the art to integrate curved eyeglass lenses with waveguides in wearable heads-up displays in order to achieve the form factor and fashion appeal expected of the eyeglass frame industry.

BRIEF SUMMARY

A wearable heads-up display may be summarized as including: a support structure that in use is worn on a head of a user; a display light source to provide display light; and a transparent combiner carried by the support structure and positioned in a field of view of an eye of the user when the support structure is worn on the head of the user, the transparent combiner including: a curved waveguide; an in-coupler physically coupled to a first area of the curved waveguide, the in-coupler to receive display light from the display light source and in-couple display light into the curved waveguide; and an out-coupler physically coupled to a second area of the curved waveguide, the out-coupler to receive display light from the curved waveguide and out-couple display light into the field of view of the eye of the user. The in-coupler and the out-coupler may each be selected from a group consisting of: a hologram, a holographic optical element, a volume diffraction grating, a surface relief diffraction grating, a transmission grating, and a reflection grating.

The first area of the curved waveguide to which the in-coupler is physically coupled may be an area on an outer surface of the curved waveguide. The second area of the curved waveguide to which the out-coupler is physically coupled may be an area on an inner surface of the curved waveguide.

The transparent combiner may further include a curved eyeglass lens, wherein the curved waveguide is at least partially embedded in an inner volume of the curved eyeglass lens. The curved waveguide may be completely contained in the inner volume of the curved eyeglass lens. The curved eyeglass lens may be a prescription eyeglass lens. The prescription eyeglass lens may have a prescription curvature. A curvature of the curved waveguide may match the prescription curvature of the prescription eyeglass lens. The curved eyeglass lens may include a convex world-side surface and a concave eye-side surface. The out-coupler may be positioned and oriented to apply a compensatory optical function to display light when the out-coupler out-couples display light from the curved waveguide. The compensatory optical function may be matched to an optical function of the convex world-side surface of the curved eyeglass lens. A length of the curved waveguide may extend across a full width of the curved eyeglass lens. The second area of the curved waveguide to which the out-coupler is physically coupled may be positioned at or proximate a center of the curved eyeglass lens.

The first area of the curved waveguide may be a first planar area of the curved waveguide and the second area of the curved waveguide may be a second planar area of the curved waveguide. The in-coupler may be a planar in-coupler physically coupled to the first planar area of the curved waveguide and the out-coupler may be a planar out-coupler physically coupled to the second planar area of the curved waveguide.

The first area of the curved waveguide may be a first curved area of the curved waveguide and the second area of the curved waveguide may be a second curved area of the curved waveguide. The in-coupler may be a curved in-coupler physically coupled to the first curved area of the curved waveguide and the out-coupler may be a curved out-coupler physically coupled to the second curved area of the curved waveguide.

The display light source may be selected from a group consisting of: a laser projector and a microdisplay.

The support structure may have a shape and geometry of a pair of eyeglasses.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for curved eyeglass lenses with planar waveguides integrated therewith. Curved eyeglass lenses with planar waveguides embedded therewith are particularly well-suited for use as or in the transparent combiner of wearable heads-up displays ("WHUDs") in order to enable the WHUDs to adopt more aesthetically-pleasing styles and, in some implementations, to enable the WHUDs to include prescription eyeglass lenses. Examples of WHUD systems, devices, and methods that are particularly well-suited for use in conjunction with the present systems, devices, and methods for curved lenses with planar waveguides are described in, for example, U.S. Non-Provisional patent application Ser. No. 15/167,458 (now US Patent Application Publication No. US 2016-0349514 A1), U.S. Non-Provisional patent application Ser. No. 15/167,472 (now US Patent Application Publication No. US 2016-0349515 A1), U.S. Non-Provisional patent application Ser. No. 15/167,484 (now US Patent Application Publication No. US 2016-0349516 A1), US Patent Application Publication No. US 2016-0377865 A1, US Patent Application Publication No. US 2016-0377866 A1, and US Patent Application Publication No. US 2016-0238845 A1.

Figure 1:
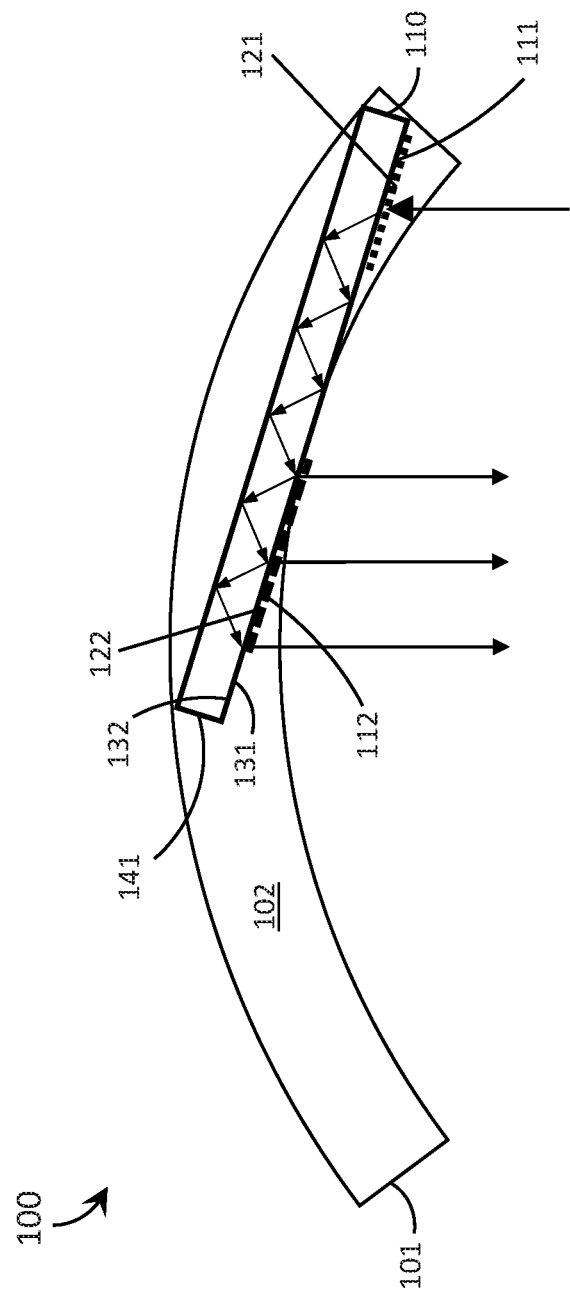
FIG. 1 is a sectional view showing a transparent combiner for use in a wearable heads-up display in accordance with an embodiment of the present systems, devices, and methods.

FIG. 1 is a sectional view showing a transparent combiner 100 for use in a WHUD in accordance with the present systems, devices, and methods. Transparent combiner 100 includes a curved eyeglass lens 101 which may or may not be a prescription eyeglass lens depending on the specific implementation. At least partially embedded in an inner volume 102 of curved eyeglass lens 101 is a planar waveguide structure 110. Planar waveguide 110 may be a conventional rectangular prism structure formed of a material with an index of refraction that is sufficiently different from that of curved eyeglass lens 101 to enable TIR within planar waveguide 110 through the inner volume 102 of curved eyeglass lens 101. In order to enable display light to couple into planar waveguide 110, transparent combiner 100 includes a planar in-coupler 121 physically coupled to a first area 111 of planar waveguide 110. Similarly, in order to enable display light to couple out of planar waveguide 110, transparent combiner 110 includes a planar out-coupler 122 physically coupled to a second area 112 of planar waveguide 110. The display light that in-couples through in-coupler 121 and out-couples through out-coupler 122 may originate from a display light source, such as a projector, a scanning laser projector, a microdisplay, or similar. In use, planar in-coupler 121 receives display light from a display light source and in-couples display light into planar waveguide 110, and planar out-coupler 122 receives display light from planar waveguide 110 and out-couples display light into the field of view of the eye of the user. A person of skill in the art will appreciate that additional optics may be employed in between the display light source and in-coupler 121 and/or in between out-coupler 122 and the eye of the user in order to shape the display light for viewing by the eye of the user.

A representative example of a path of display light through planar waveguide 110 is illustrated by the arrows in FIG. 1.

Throughout this specification and the appended claims, the term "waveguide" is used in a general sense to refer to a transparent optical structure through the inner volume of which display light is propagated by TIR. Unless the specific context requires otherwise, the term "waveguide" is not meant to impart or require any features or limitations with respect to the wave nature of light (e.g., "single mode waveguide") and should be understood to be interchangeable with related terms for functionally similar structures known in the field of optics, such as "lightguide" or "lightpipe."

Throughout this specification and the appended claims, the terms "in-coupler" and "out-coupler" are generally used to refer to any type of optical grating structure, including without limitation: diffraction gratings, holograms, holographic optical elements (e.g., optical elements employing one or more holograms), volume diffraction gratings, volume holograms, surface relief diffraction gratings, and/or surface relief holograms. Depending on the specific implementation (e.g., depending on the specific position of the in-coupler or out-coupler), the in-couplers /out-couplers herein may be of the transmission type (meaning they allow the display light to transmit therethrough and apply their designed optical function(s) to the light during such transmission) in which case they are referred to as "transmission in-/out-couplers," or they may be of the reflection type (meaning they reflect the display light and apply their designed optical function(s) to the light during such reflection) in which case they are referred to as "reflection in-/out-couplers." In the illustrated implementation of FIG. 1, in-coupler 121 and out-coupler 122 are both transmission gratings positioned on respective areas 111, 112 of an outer surface 131 of planar waveguide 110; however, in alternative implementations either or both of in-coupler 121 and/or out-coupler 122 may be a transmission grating positioned on an inner surface 132 of planar waveguide 110 and/or either or both of in-coupler 121 and/or out-coupler 122 may be a reflection grating (in the latter case, a reflection grating would be positioned on an inner/outer surface of planar waveguide 110 that is opposite the surface upon which gratings 121, 122 are illustrated in FIG. 1, across a thickness of planar waveguide 110).

In the illustrated implementation of FIG. 1, planar waveguide 110 is completely embedded in the inner volume 102 of curved eyeglass lens 101, meaning that all surface of planar waveguide 110 are fully enclosed by the material of curved eyeglass lens 101. In alternative implementations, a planar waveguide may be only partially embedded or contained within the inner volume of a curved eyeglass lens.

Figure 2:
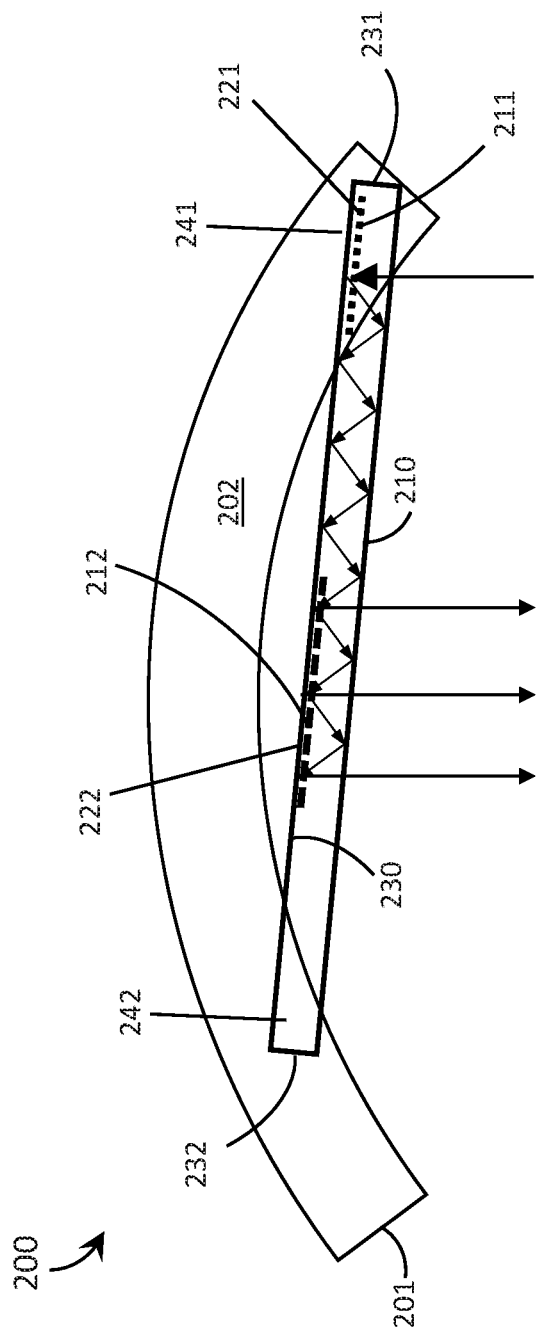
FIG. 2 is a sectional view showing a transparent combiner for use in a wearable heads-up display in accordance with another embodiment of the present systems, devices, and methods.

FIG. 2 is a sectional view showing another transparent combiner 200 for use in a WHUD in accordance with the present systems, devices, and methods. Transparent combiner 200 is similar to transparent combiner 100 from FIG. 1 in that transparent combiner 200 includes a curved eyeglass lens 201 and a planar waveguide 210 with an in-coupler 221 coupled to a first area 211 thereof and an out-coupler 222 coupled to a second area 212 thereof; however, in transparent combiner 200 planar waveguide 210 is not completely embedded in the inner volume 202 of curved eyeglass lens 201. Instead, planar waveguide 210 has a first end 231 physically embedded in a first region 241 (e.g., physically coupled to a first point in first region 241) of curved eyeglass lens 210 and a second end 232 (opposite first end 231 across a length of planar waveguide 210) physically embedded in a second region 242 (e.g., physically coupled to a second point in second region 242) of curved eyeglass lens 201. In this way, planar waveguide 210 forms a kind of "bridge" across regions 241 and 242 on a curved surface of curved eyeglass lens 201. In the illustrated implementation of FIG. 2, in-coupler 221 and out-coupler 222 are both reflection gratings positioned on respective areas 211, 212 of an inner surface 230 of planar waveguide 210.

A representative example of a path of display light through planar waveguide 210 is illustrated by the arrows in FIG. 2.

In FIG. 1, planar waveguide 110 is completely embedded within an inner volume of curved eyeglass lens 101, but planar waveguide 110 only extends across a portion of a total width of curved eyeglass lens 101. This is perfectly acceptable for some applications; however, an end 141 of planar waveguide 110 within the inner volume 102 of curved eyeglass lens 101 can produce a seam that may be visible to the user and/or other people in close proximity to the user. Such a seam can be undesirable in applications where aesthetics of the WHUD are particularly important. In order to prevent the formation/presence of such a visible seam, the length of the planar waveguide may be extended across the full width of the curved eyeglass lens. Such a configuration requires that the curvature and thickness of the curved eyeglass lens provide an inner volume capable of accommodating a planar structure across its full width.

Throughout this specification and the appended claims, the term "full width" is used in a loose sense to generally refer to "at least 90% of the total width."

Figure 3:
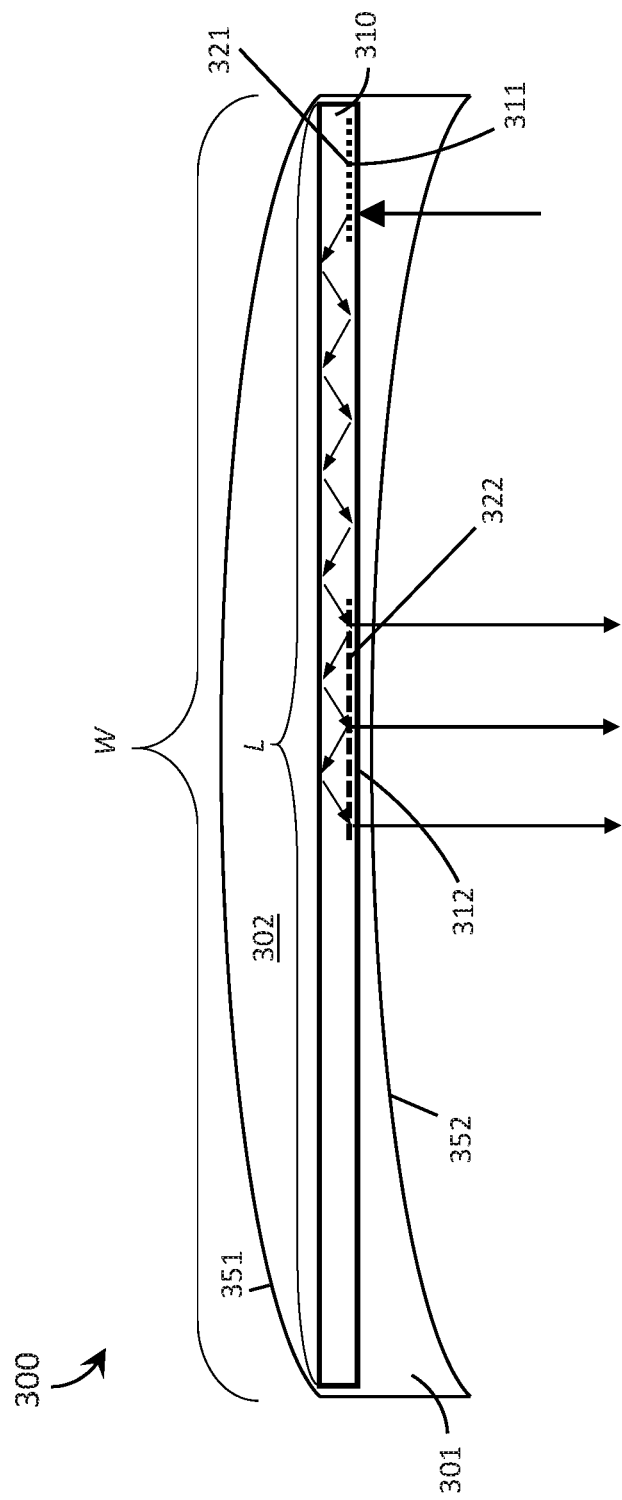
FIG. 3 is a sectional view showing a transparent combiner for use in a wearable heads-up display in accordance with another embodiment of the present systems, devices, and methods.

FIG. 3 is a sectional view showing another transparent combiner 300 for use in a WHUD in accordance with the present systems, devices, and methods. Transparent combiner 300 is similar to transparent combiner 100 from FIG. 1 in that transparent combiner 300 includes a curved eyeglass lens 301 with a planar waveguide 310 completely embedded in the inner volume 302 thereof, and with planar waveguide 310 including an in-coupler 321 coupled to a first area 311 thereof and an out-coupler 322 coupled to a second area 312 thereof; however, in transparent combiner 300 a length L of planar waveguide 310 extends across a full width W of curved eyeglass lens 301. As previously described, this configuration helps prevent seams corresponding to the edges or ends of planar waveguide 310 from being visible in the inner volume 302 of curved eyeglass lens 301. A further benefit of this configuration is that it provides greater flexibility for where planar out-coupler 322 is positioned within the field of view of the user. In the illustrated example of FIG. 3, the second area 312 of planar waveguide 310 to which planar out-coupler 322 is physically coupled is positioned at or proximate a center of curved eyeglass lens 301 such that display light (represented by arrows in FIG. 3) generally appears in the user's field of view when the user is gazing straight ahead.

Depending on the particular needs of the user, curved eyeglass lens 301 may be a prescription eyeglass lens (i.e., if the user typically requires corrective lenses) or a nonprescription/"plano" eyeglass lens (i.e., if the user typically does not require corrective lenses). In either case, eyeglass lens 301 is advantageously curved for at least aesthetic purposes. Furthermore, at least two surfaces of eyeglass lens 301 are advantageously curved.

Eyeglass lens 301 includes a world-side surface 351 and an eye-side surface 352. When transparent combiner 300 is mounted in a WHUD system (e.g., in an eyeglasses frame) and worn on the head of the user, world-side surface 351 faces outward from the user towards the user's environment and eye-side surface 352 faces inward towards the eye of the user. The curvature of eyeglass lens 301 is such that world-side surface 351 is a convex surface and eye-side surface 352 is a concave surface. In implementations for which eyeglass lens 301 is a prescription eyeglass lens, either or both of convex world-side surface 351 and/or concave eye-side surface 352 may embody a curvature that imparts an optical function on environmental light that is transmitted through eyeglass lens 301. When convex world-side surface 351 embodies a curvature that imparts an optical function (e.g., optical power) on environmental light passing therethrough, out-coupler 322 may advantageously be designed, configured, positioned, and/or oriented to apply a compensatory optical function to display light that is out-coupled by out-coupler 322. Generally, the compensatory optical function applied by out-coupler 322 may be matched (i.e., at least approximately equal to within 20% or less) to the optical function of convex world-side surface 351 of curved eyeglass lens 301. In other words, out-coupler 322 is generally operable to out-couple display light from planar waveguide 310, and in doing so, out-coupler 322 may be further operable to apply a compensatory optical function to the display light in order to cause the display light to appear as though it has passed through convex world-side surface 351 even though the display light has not passed through convex world-side surface 351 but rather has propagated through planar waveguide 310 at least partially embedder din the inner volume 302 of eyeglass lens 301.

The various embodiments described herein generally provide systems, devices, and methods for at least partially embedding at least a portion of a planar waveguide in at least a portion of an inner volume of a curved eyeglass lens. Such embedding may be achieved using a variety of different processes and techniques depending on the requirements of the specific implementation. For example, at least a portion of a planar waveguide may be at least partially embedded in at least a portion of a curved eyeglass lens by a molding/casting process in which the at least a portion of the planar waveguide to be embedded in the curved eyeglass lens is positioned in a mold and the mold is then filled with a liquid material (e.g., resin) via an injection process. The liquid material may then be cured to form the rigid structure of the eyeglass lens and the removed from the mold. Alternatively, at least a portion of a planar waveguide may be at least partially embedded in at least a portion of a curved eyeglass lens by a lamination process, or by sandwiching together two halves (more generally, "portions") of the curved eyeglass lens around the planar waveguide using an optically transparent adhesive.

Implementations of the present systems, devices, and methods that involve lens casting/molding and/or that embed physical structures (e.g., planar waveguide 110) in the inner volume of a lens may do so using the systems, methods, and devices described in US Patent Application Publication No. 2017-0068095, U.S. Provisional Patent Application Ser. No. 62/534,099, and/or U.S. Provisional Patent Application Ser. No. 62/565,677.

As previously described, U.S. Non-Provisional patent application Ser. No. 15/167,458 (now US Patent Application Publication No. US 2016-0349514 A1), U.S. Non-Provisional patent application Ser. No. 15/167,472 (now US Patent Application Publication No. US 2016-0349515 A1), U.S. Non-Provisional patent application Ser. No. 15/167,484 (now US Patent Application Publication No. US 2016-0349516 A1), US Patent Application Publication No. US 2016-0377865 A1, US Patent Application Publication No. US 2016-0377866 A1, and US Patent Application Publication No. US 2016-0238845 A1 all describe WHUD architectures that are well-suited to be adapted to use the transparent combiners 100, 200, and/or 300 described in the present systems, devices, and methods. A general example of such a WHUD is depicted in FIG. 4.

Figure 4:
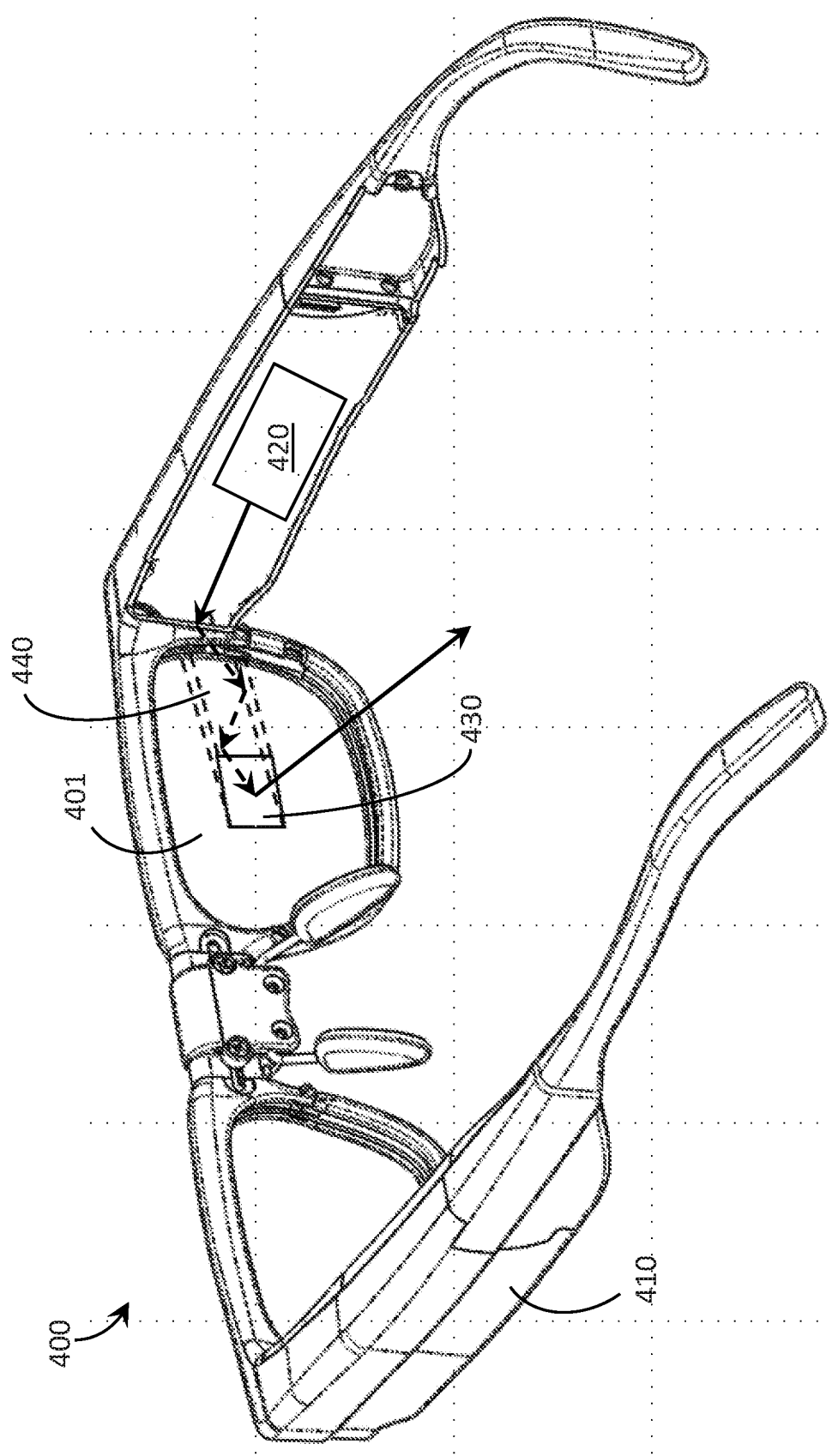
FIG. 4 is an illustrative diagram showing an example of a wearable heads-up display employing a curved transparent combiner in accordance with an embodiment of the present systems, devices, and methods.

FIG. 4 is an illustrative diagram showing an example of a WHUD 400 employing a curved transparent combiner 401 in accordance with an embodiment of the present systems, devices, and methods. WHUD 400 generally includes a support structure 410 that has the shape/geometry of a pair of eyeglasses and in use is worn on the head of the user. Support structure 410 carries a display light source 420 (e.g., a laser projector or a microdisplay, which may or may not be at least partially contained within an inner volume of support structure 410) and also carries curved transparent combiner 401 which is positioned in a field of view of an eye of the user when support structure 410 is worn on the head of the user. Curved transparent combiner 401 may include any of transparent combiner 100 from FIG. 1, transparent combiner 200 from FIG. 2, transparent combiner 300 from FIG. 3, or any combination or variation thereof. Generally, transparent combiner 401 is shown as a curved eyeglass lens including a waveguide portion 440 (shown in dashed lines to indicate that it may not actually be visible to the user) and an out-coupler 430. A representative optical path of light from display light source 420 is illustrated with arrows in FIG. 4. The display light leaves source 420 and enters waveguide 440 of transparent combiner 401 (e.g., through an in-coupler, not visible in the view of FIG. 4), where it is totally internally reflected until it reaches out-coupler 430, from whence it emerges and is directed towards the eye of the user (with a compensatory optical function applied thereto in some cases, as previously described).

Transparent combiners 100, 200, and 300 all generally employ a planar waveguide (110, 210, 310) at least partially embedded in an inner volume (102, 202, 302) of a curved eyeglass lens (101, 201, 301). In some applications, it may be advantageous to employ a curved waveguide rather than a planar waveguide. For example, a curved waveguide may offer the advantage of more easily and seamlessly integrating with a curved eyeglass lens; however, a curved waveguide may also introduce additional complexity in the design and operation of the waveguide itself, such complexity arising from the fact that display light internally reflecting within the curved waveguide necessarily reflects from curved surfaces as opposed to planar surfaces. Such can add distortions to the display light and require careful characterization of the display light optical paths in order to ensure that the critical angle threshold for TIR continues to be satisfied over the range of angles of incidence imposed by the curved reflecting surfaces.

Figure 5:
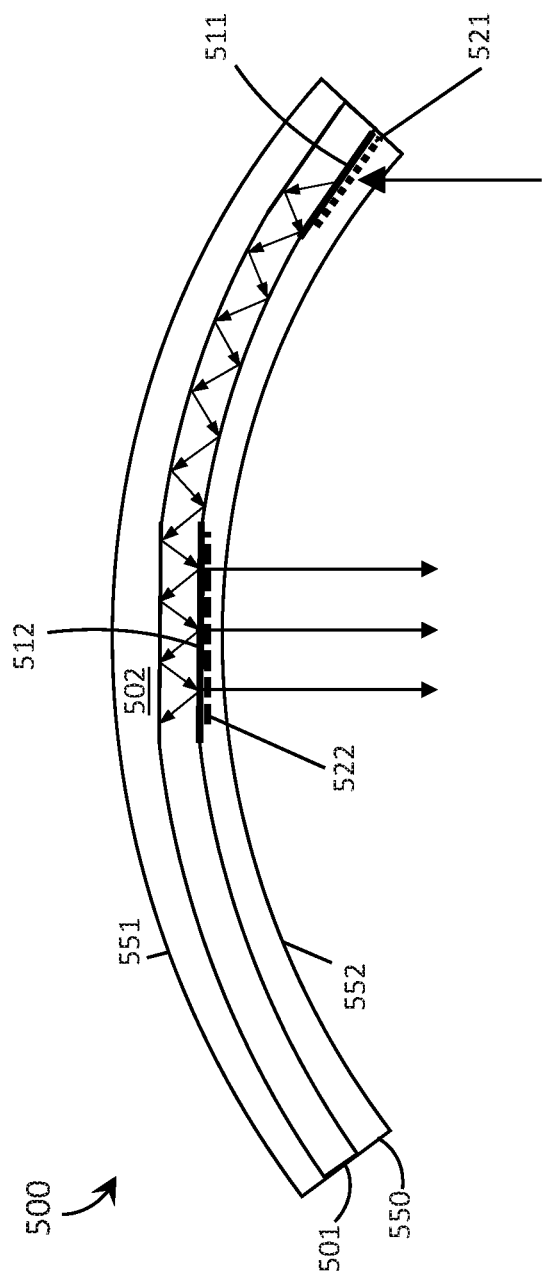
FIG. 5 is a sectional view showing a transparent combiner for use in a wearable heads-up display in accordance with another embodiment of the present systems, devices, and methods.

FIG. 5 is a sectional view showing another transparent combiner 500 for use in a WHUD in accordance with the present systems, devices, and methods. Transparent combiner 500 includes a curved waveguide 501 having a first area 511 at which is physically coupled an in-coupler 521 and a second area 512 at which is physically coupled an out-coupler 522. Other than the fact that waveguide 501 is curved as opposed to planar (such as waveguides 110, 210, and 310), many of the features and descriptions of transparent combiners 100, 200, and 300 may apply to transparent combiner 500 (e.g., with respect to materials, the nature and operation of in-coupler 521 and out-coupler 522, etc.).

In some implementations, the curvature of curved waveguide 501 may correspond to a prescription curvature of a prescription eyeglass lens, in which case curved waveguide 5301 may also function as a curved eyeglass lens (e.g., similar to curved eyeglass lens 101 from transparent combiner 100 and/or curved eyeglass lens 201 from transparent combiner 200). That is, curved waveguide 501 may itself be (i.e., also perform as) a curved eyeglass lens and may embody, for example, a prescription curvature. In other implementations (and in the illustrated implementation of FIG. 5), curved waveguide 501 may be integrated with a curved eyeglass lens 550. For example, curved waveguide 501 may be completely embedded and contained in an inner volume 502 of curved eyeglass lens 550. In this case, curved eyeglass lens 550 may be a prescription eyeglass lens having a prescription curvature and the curvature of curved waveguide 501 may match the prescription curvature of prescription eyeglass lens 550.

Eyeglass lens 550 includes a world-side surface 551 and an eye-side surface 552. When transparent combiner 300 is mounted in a WHUD system (e.g., in an eyeglasses frame) and worn on the head of the user, world-side surface 551 faces outward from the user towards the user's environment and eye-side surface 552 faces inward towards the eye of the user. The curvature of eyeglass lens 550 is such that world-side surface 551 is a convex surface and eye-side surface 552 is a concave surface. In implementations for which eyeglass lens 550 is a prescription eyeglass lens, either or both of convex world-side surface 551 and/or concave eye-side surface 552 may embody a curvature that imparts an optical function on environmental light that is transmitted through eyeglass lens 550. When convex world-side surface 551 embodies a curvature that imparts an optical function (e.g., optical power) on environmental light passing therethrough, out-coupler 522 may advantageously be designed, configured, positioned, and/or oriented to apply a compensatory optical function to display light that is out-coupled by out-coupler 522. Generally, the compensatory optical function applied by out-coupler 522 may be matched (i.e., at least approximately equal to within 20% or less) to the optical function of convex world-side surface 551 of curved eyeglass lens 550. In other words, out-coupler 522 is generally operable to out-couple display light from curved waveguide 501, and in doing so, out-coupler 522 may be further operable to apply a compensatory optical function to the display light in order to cause the display light to appear as though it has passed through convex world-side surface 551 of eyeglass lens 550 even though the display light has not passed through convex world-side surface 551 of eyeglass lens 550 but rather has propagated through curved waveguide 501 at least partially embedded in the inner volume 502 of eyeglass lens 550.

Similar to planar waveguide 310 from FIG. 3, the length of curved waveguide 501 extends across (i.e., is at least approximately equal to within about 10%) the full width of curved eyeglass lens 550 in order to reduce the likelihood of visible "seams" at the edges of waveguide 501, and further to facilitate placement of second area 512 of curved waveguide 501 to which out-coupler 522 is physically coupled in a position that is at or proximate a center of curved eyeglass lens 550.

As described previously, curved waveguide 501 has a first area 511 at which is physically coupled in-coupler 521 and a second area 512 at which is physically coupled out-coupler 522. In the illustrated implementation of FIG. 5, first area 511 and second area 512 are respective planar areas of curved waveguide 501. That is, first area 511 of curved waveguide 501 is a first planar area 511 of curved waveguide 501 and second area 512 of curved waveguide 501 is a second planar area 512 of curved waveguide 501. First area 511 and second area 512 are planar areas in FIG. 5 to facilitate receiving and carrying planar in-coupler 521 and planar out-coupler 522, respectively. In some implementations (such as that illustrated in FIG. 5), it is advantageous for in-coupler 521 to be a planar in-coupler 521 and for out-coupler 522 to be a planar out-coupler 522 because a planar in-/out-coupler is generally simpler to design and manufacture than a curved in-/out-coupler. Thus, in order to accommodate planer in-coupler 521, first area 511 of curved waveguide 501 is a planar first area 511 and, in order to accommodate planar out-coupler 522, second area 512 of curved waveguide 501 is a planar second area 512. Either or both of planar areas 511, 512 may be implemented as a respective planar surface on one side of curved waveguide 501 (such that the opposing surface across a thickness of curved waveguide 501 is a continuous curved surface) or as a respective planar segment of curved waveguide 501 (such that the opposing surface across a thickness of curved waveguide 501 is a parallel planar surface).

Planar out-coupler 522 may, in some implementations, be designed, operable, positioned, and/or oriented to apply a compensatory optical function to display light that it out-couples from curved waveguide 501. The compensatory optical function may relate to the optical function imparted by the curvature of the convex world-side surface 551 of eyeglass lens 550 as previously described, and/or the compensatory optical function may counteract any distortions that may result from the position and orientation of planar out-coupler 522 in relation to concave eye-side surface 552 of curved eyeglass lens 550.

First planar area 511 and second planar area 512 may be formed by etching, grinding, or otherwise shaping surfaces of curved waveguide 501. Alternatively, curved waveguide 501 may be cast in a molding process and the molds themselves may include first and second planar areas 511, 512 on the otherwise curved surface of curved waveguide 501.

Curved waveguide 501 may be integrated with curved eyeglass lens 550 using any of the processes and techniques (e.g., molding, casting, laminating, sandwiching, etc.) described previously in relation to the integration of a planar waveguide (110, 210, 310) with a curved lens (101, 201, 301), with the distinction that nay molds, processes, etc. must accommodate the curvature of curved waveguide 501.

A representative example of a path of display light through curved waveguide 501 is illustrated by the arrows in FIG. 5.

As an alternative to the implementation of FIG. 5 where first area 511 and second area 512 are respective planar areas (and, correspondingly, in-coupler 521 and out-coupler 522 are respective planar couplers), curved areas and curved couplers may be used.

Figure 6:
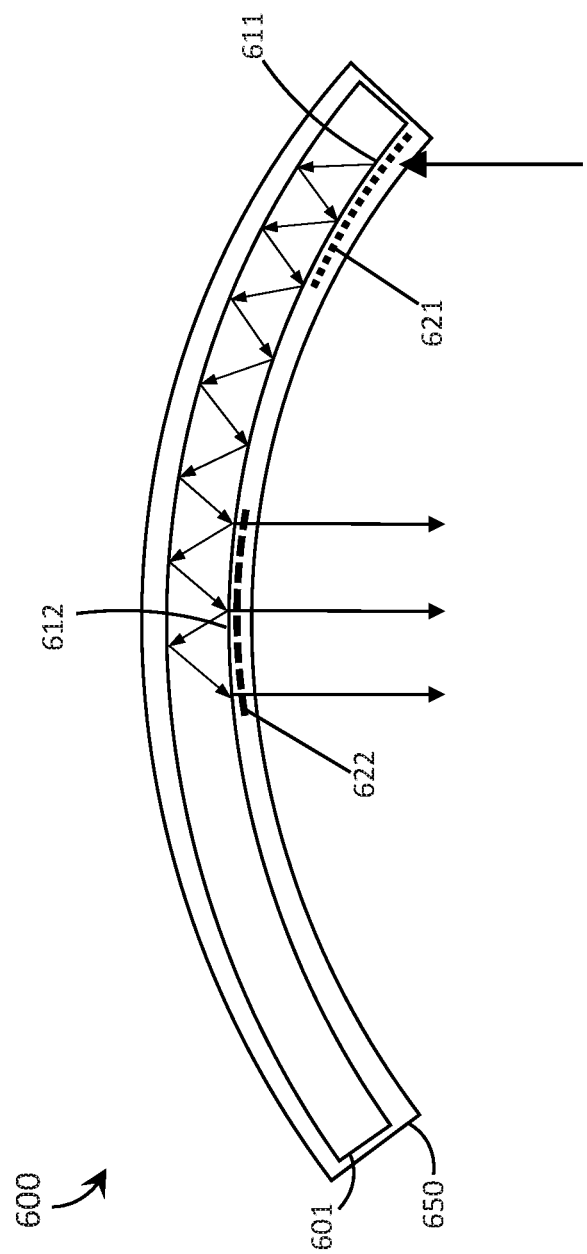
FIG. 6 is a sectional view showing a transparent combiner for use in a wearable heads-up display in accordance with another embodiment of the present systems, devices, and methods.

FIG. 6 is a sectional view showing another transparent combiner 600 for use in a WHUD in accordance with the present systems, devices, and methods. Transparent combiner 600 is substantially similar to transparent combiner 500 from FIG. 5, and many of the same features and description apply, except that in transparent combiner 600 in-coupler 621 is a curved in-coupler 621 and out-coupler 622 is a curved out-coupler 622. In brief, transparent combiner 600 includes a curved waveguide 601 having a first curved area 611 at which curved in-coupler 621 is physically coupled and a second curved area 612 at which curved out-coupler 622 is physically coupled. Curved waveguide 601 may itself serve as a curved eyeglass lens or, as in the illustrated embodiment of FIG. 6, curved waveguide 601 may be integrated with (e.g., embedded in the inner volume of) a curved eyeglass lens 650.

Curved out-coupler 622 may be designed, operable, positioned, and/or oriented to compensate for (e.g., counteract) a convergence imparted on display light out-coupled thereby due to the concave curvature of curved out-coupler 622 and to cause display light out-coupled thereby to propagate along parallel optical paths as represented by the arrows in FIG. 6.

Implementations of the present systems, devices, and methods that employ curved in-/out-couplers may, as appropriate, employ the systems, devices, and methods described in US Patent Application Publication No. US 2017-0212290 A1.

Returning briefly to FIG. 4, in an alternative implementation to that described previously transparent combiner 401 of WHUD 400 may employ a curved waveguide 440 and either a planar or a curved out-coupler 430 depending on the specific requirements of the application. That is, either transparent combiner 500 of FIG. 5 or transparent combiner 600 of FIG. 6 may be used as transparent combiner 401 in WHUD 400 of FIG. 4.

In some implementations, a waveguide may terminate at the out-coupler because there is no desire to propagate light within the waveguide beyond that point. However, as previously described, this can result in a visible seam within or upon the eyeglass lens where the waveguide ends. In order to avoid this seam, in some implementations, a waveguide may be extended beyond the out-coupler to the far edge of an eyeglass lens even though there is no intention to propagate light within the waveguide beyond the out-coupler (as illustrated in FIG. 3).

In some implementations, a refractive index barrier (i.e., a material having an intermediate refractive index) may be employed in between an in-coupler/out-coupler and any lens/waveguide material in order to enable light to couple between the in-coupler/out-coupler and the lens/waveguide material.

In some implementations, an air gap may be included to separate the surfaces of the planar/curved waveguide from the surfaces of the curved eyeglass lens and achieve a maximum difference in the refractive index across the interface of the planar/curved waveguide. In other words, air gaps may be used to deliberately separate the TIR surfaces of the planar/curved waveguide (i.e., the surfaces of the planar/curved waveguide from which display light is totally internally reflected in use) from the curved eyeglass lens material (i.e., no physical contact therebetween) to maximize the change in refractive index at the surface of the planar/curved waveguide and facilitate TIR. In other implementations, a low-refractive index coating may be applied to the TIR surface(s) of the planar/curved waveguide instead of an air gap.

Some of the waveguides or in-couplers/out-couplers described herein (particularly those that employ curvature) may introduce optical distortions in displayed images. In accordance with the present systems, devices, and methods, such optical distortions may be corrected (i.e., compensated for) in the software that drives the display engine. For example, the geometrical output of the transparent combiner may be measured without any compensation measure in place and a reverse transform of such output may be applied in the generation of light by the display light source.

The relative positions of waveguides within lenses/combiners shown herein are used for illustrative purposes only. In some implementations, it may be advantageous for a waveguide to be positioned centrally within a combiner, whereas in other implementations it may be advantageous for a waveguide to be positioned off-center. In particular, it may be advantageous for a waveguide to couple to the corner of the support structure/glasses frame where the temple of the glasses frame meets the rims, because this is an advantageous location to route display light from a scanning laser projector or microdisplay with minimal impact on form factor.

The various embodiments described herein generally reference a single eye of a user (i.e., monocular applications), but a person of skill in the art will readily appreciate that the present systems, devices, and methods may be duplicated in a WHUD in order to provide binocular applications.

The WHUDs described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The waveguides described herein may employ any of the systems, devices, and/or methods described in U.S. Provisional Patent Application Ser. No. 62/525,601, U.S. Provisional Patent Application Ser. No. 62/557,551, U.S. Provisional Patent Application Ser. No. 62/557,554, and/or U.S. Provisional Patent Application Ser. No. 62/573,978.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/167,458 (now US Patent Application Publication No. US 2016-0349514 A1), U.S. Non-Provisional patent application Ser. No. 15/167,472 (now US Patent Application Publication No. US 2016-0349515 A1), U.S. Non-Provisional patent application Ser. No. 15/167,484 (now US Patent Application Publication No. US 2016-0349516 A1), US Patent Application Publication No. US 2016-0377865 A1, US Patent Application Publication No. US 2016-0377866 A1, US Patent Application Publication No. US 2016-0238845 A1, US Patent Application Publication No. US 2017-0212290 A1, US Patent Application Publication No. 2017-0068095, U.S. Provisional Patent Application Ser. No. 62/534,099, U.S. Provisional Patent Application Ser. No. 62/565,677, U.S. Provisional Patent Application Ser. No. 62/525,601, U.S. Provisional Patent Application Ser. No. 62/557,551, U.S. Provisional Patent Application Ser. No. 62/557,554, and U.S. Provisional Patent Application Ser. No. 62/573,978 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display (WHUD) comprising:
a support structure that in use is worn on a head of a user;
a display light source to provide display light; and
a transparent combiner carried by the support structure and positioned in a field of view of an eye of the user when the support structure is worn on the head of the user, the transparent combiner comprising:
a prescription eyeglass lens having a prescription curvature;
a curved waveguide at least partially embedded in an inner volume of the prescription eyeglass lens, wherein a curvature of the curved waveguide matches the prescription curvature of the prescription eyeglass lens;
an optical in-coupler physically coupled to a first area of the curved waveguide, the optical in-coupler to receive display light from the display light source and optically in-couple display light into the curved waveguide; and
an optical out-coupler physically coupled to a second area of the curved waveguide, the optical out-coupler to receive display light from the curved waveguide and optically out-couple display light into the field of view of the eye of the user.

2. The WHUD of claim 1 wherein the optical in-coupler and the optical out-coupler are each selected from a group consisting of: a hologram, a holographic optical element, a volume diffraction grating, a surface relief diffraction grating, a transmission grating, and a reflection grating.

3. The WHUD of claim 1 wherein the first area of the curved waveguide to which the optical in-coupler is physically coupled is an area on an outer surface of the curved waveguide.

4. The WHUD of claim 1 wherein the second area of the curved waveguide to which the optical out-coupler is physically coupled is an area on an inner surface of the curved waveguide.

5. The WHUD of claim 1 wherein the curved waveguide is completely contained in the inner volume of the prescription eyeglass lens.

6. The WHUD of claim 1 wherein the prescription eyeglass lens includes a convex world-side surface and a concave eye-side surface.

7. The WHUD of claim 6 wherein the optical out-coupler is positioned and oriented to apply a compensatory optical function to display light when the optical out-coupler out-couples display light from the curved waveguide, the compensatory optical function matched to an optical function of the convex world-side surface of the prescription eyeglass lens.

8. The WHUD of claim 1 wherein a length of the curved waveguide extends across a full width of the prescription eyeglass lens.

9. The WHUD of claim 8 wherein the second area of the curved waveguide to which the optical out-coupler is physically coupled is positioned at or proximate a center of the prescription eyeglass lens.

10. The WHUD of claim 1 wherein the first area of the curved waveguide is a first planar area of the curved waveguide and the second area of the curved waveguide is a second planar area of the curved waveguide, and wherein the optical in-coupler is a planar optical in-coupler physically coupled to the first planar area of the curved waveguide and the optical out-coupler is a planar optical out-coupler physically coupled to the second planar area of the curved waveguide.

11. The WHUD of claim 1 wherein the first area of the curved waveguide is a first curved area of the curved waveguide and the second area of the curved waveguide is a second curved area of the curved waveguide, and wherein the optical in-coupler is a curved optical in-coupler physically coupled to the first curved area of the curved waveguide and the optical out-coupler is a curved optical out-coupler physically coupled to the second curved area of the curved waveguide.

12. The WHUD of claim 1 wherein the display light source is selected from a group consisting of: a laser projector and a microdisplay.

13. The WHUD of claim 1 wherein the support structure has a shape and geometry of a pair of eyeglasses.

* * * * *